3,381,026
3 - ALKYL - 4 - HYDROXY - 5 - (DIALKYLAMINO-
ALKYL) - BENZYL N,N - DIALKYLDITHIOCAR-
BAMATES AND METHOD OF PREPARATION
Francis X. O'Shea, Wolcott, Conn., assignor to Uniroyal,
Inc., a corporation of New Jersey
No Drawing. Filed June 9, 1965, Ser. No. 462,745
6 Claims. (Cl. 260—455)

ABSTRACT OF THE DISCLOSURE

Compositions of matter and their method of preparation. The compositions having the following formula:

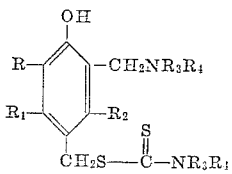

wherein R is an alkyl, a cycloalkyl, or an aralkyl radical, $R_1$ and $R_2$ are hydrogen or methyl, and $R_3$ and $R_4$ are alkyl radicals, are prepared by reacting a phenolic compound with formaldehyde, a secondary amine and carbon disulfide. These compounds are useful as fungicides and bactericides. The method involves reacting a phenolic compound with formaldehyde, a secondary amine and carbon disulfide.

---

This invention relates to new chemicals.
The chemicals of the present invention may be represented by the general formula:

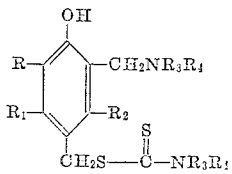

wherein R is an alkyl radical of up to 12 carbon atoms or a cycloalkyl radical of 5 to 8 carbon atoms or an aralkyl radical of 7 to 9 carbon atoms, $R_1$ and $R_2$ are hydrogen or methyl, and $R_3$ and $R_4$ are alkyl radicals having up to 5 carbon atoms each.

The compounds of the present invention are prepared by reacting one molar equivalent of a phenolic compound of the formula

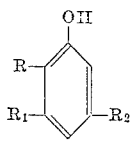

wherein R, $R_1$ and $R_2$ are as above described, with two molar equivalents of formaldehyde, two molar equivalents of a secondary amine of the formula $R_3R_4NH$ in which $R_2$ and $R_3$ are as above described and one molar equivalent of carbon disulfide in an alcohol solvent. The overall equation for the reaction is:

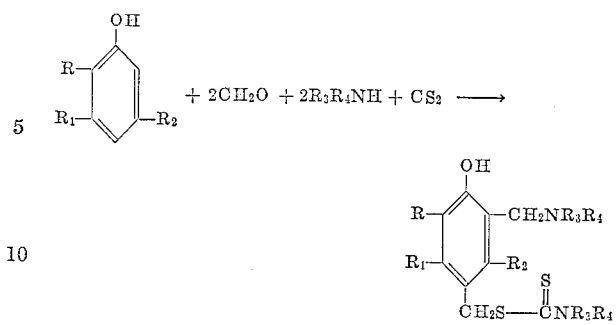

In carrying out the preparation, the phenolic compound and secondary amine and formaldehyde may be mixed in an alcohol solvent and reacted for a short time at 0° C., the time and temperature not being critical, and the carbon disulfide is then added to the reaction mixture. The reaction mixture is heated to completion of the reaction, usually at the reflux temperature of the alcohol solvent for 1 to 12 hours, the time and temperature not being critical. If desired, the carbon disulfide may be added initially to the reaction mixture, and the reactions will take place as above. The reactions are as follows:

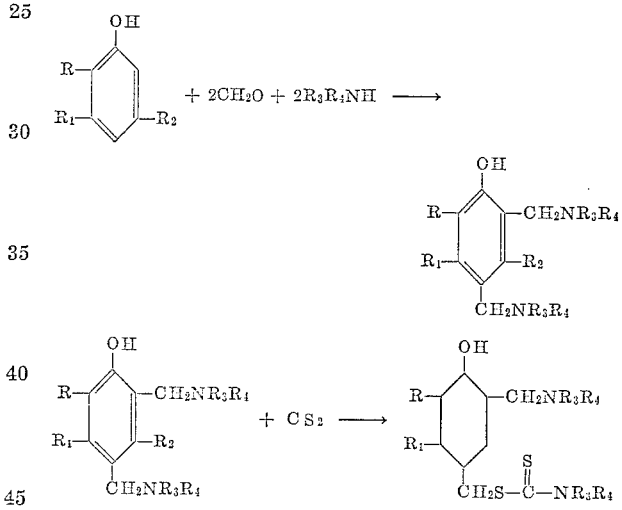

The second reaction is unique since it is unanticipated that when two such reactive positions, ortho and para to the phenolic hydroxide group, are present, the one para to the phenolic hydroxide reacts preferentially with the carbon disulfide to leave the secondary aminomethyl group in the ortho position essentially unreacted.

The hydrocarbon substituted phenols which may be used include o-cresol, o-ethylphenol, o-isopropylphenol, o-sec-butylphenol, o-t-butylphenol, o-t-amylphenol, o-(alpha - methylpentyl)phenol, o - (alpha - methylheptyl) phenol, o-(alpha-methylnonyl)phenol, o-(alpha-methylundecyl)phenol, o-cyclohexylphenol, o-(methylcyclohexyl)phenol, o-cyclooctylphenol, o-benzylphenol, o-(alphamethylbenzyl)phenol, o - (alpha,alpha - dimethylbenzyl) phenol, 2,3-dimethylphenol, 2,5-dimethylphenol, 2,3,5-trimethylphenol, 6-isopropyl-m-cresol, 2-isopropyl-3,5-dimethylphenol, 6-t-butyl-m-cresol, 2-t-butyl-3,5-dimethylphenol, 6-sec-butyl-m-cresol, 2-sec-butyl-3,5-dimethylphenol, 6-(alpha-methylpentyl)-m-cresol, 2-(alpha-methylpentyl) - 3,5 - dimethylphenol, 6-t-amyl-m-cresol, 2-t-amyl - 3,5 - dimethylphenol, 6-(alpha - methylheptyl)-m-cresol, 2-(alpha-methylheptyl) - 3,5 - dimethylphenol, 6-(alpha-methylnonyl) - m - cresol, 2-(alpha-methylnonyl)-3,5-dimethylphenol, 6-(alpha - methylundecyl)-m-cresol, 2-(alpha - methylundecyl)-3,5-dimethylphenol, 6-t-octyl-m-cresol, 2-t-octyl-3,5-dimethylphenol, 6-cyclohexyl-m-cresol, 2-cyclohexyl-3,5-dimethylphenol, 6-cyclooctyl-m-cresol, 2-cyclooctyl - 3,5 - dimethylphenol, 6-benzyl-m-cresol, 2-benzyl-3,5-dimethylphenol, 6-(alpha-methylbenzyl)-m-cresol, 2-(alpha-methylbenzyl) - 3,5 - xylenol, 6-(alpha,alpha-dimethylbenzyl) - m - cresol and 2-(alpha,alpha-dimethylbenzyl)-3,5-xylenol. The preferred phenols are o-alkylphenols in which the alkyl group contains from one to four carbon atoms such as o-cresol and o-t-butylphenol. The secondary amines which may be used include dimethylamine, methylethylamine, diethylamine, dibutylamine, diamylamine. The preferred amine is dimethylamine.

The following chemicals are illustrative of the compounds of the present invention using the above referred hydrocarbon substituted phenols and secondary amines in their preparation:

3-methyl-4-hydroxy-5-(dimethylaminomethyl)-benzyl N,N-dimethyldithiocarbamate 3-t-butyl-4-hydroxy-5-(dimethylaminomethyl)-benzyl N,N-dimethyldithiocarbamate 3-cyclohexyl-4-hydroxy-5-(dimethylaminomethyl)-benzyl N,N-dimethyldithiocarbamate 3-cyclooctyl-4-hydroxy-5-(dimethylaminomethyl)-benzyl N,N-dimethyldithiocarbamate 3-isopropyl-4-hydroxy-5-(dimethylaminomethyl)-benzyl N,N-dimethyldithiocarbamate 3-sec-butyl-4-hydroxy-5-(dimethylaminomethyl)-benzyl N,N-dimethyldithiocarbamate 3-(alpha-methylnonyl)-4-hydroxy-5-(dimethylaminomethyl)benzyl N,N-dimethyldithiocarbamate 2,5-dimethyl-3-(dimethylaminomethyl)-4-hydroxybenzyl N,N-dimethyldithiocarbamate 2,3-dimethyl-4-hydroxy-5-(dimethylaminomethyl)-benzyl N,N-dimethyldithiocarbamate 3-methyl-4-hydroxy-5-(dibutylaminomethyl)benzyl N,N-dibutyldithiocarbamate 3-methyl-4-hydroxy-5-(ethylisopropylaminomethyl)-benzyl N-ethyl-N-isopropyldithiocarbamate 3-methyl-4-hydroxy-5-[di(beta-hydroxyethyl)aminomethyl] N,N-di(beta-hydroxyethyl)dithiocarbamate 2,6-dimethyl-3-(alpha,alpha-dimethylbenzyl)-4-hydroxy-5-(dimethylaminomethyl)benzyl N,N-dimethyldithiocarbamate 2,6-dimethyl-3-(alpha-methylundecyl)-4-hydroxy-5-(dimethylaminomethyl)benzyl N,N-dimethyldithiocarbamate The chemicals of the present invention are effective fungicides and bactericides as described and claimed in the copending application of Francis X. O'Shea, Bogislav von Schmeling and Mitchell D. Dudarevitch filed concurrently herewith, now U.S. Patent No. 3,276,954.

The following examples illustrate the preparation of the compounds of the present invention. All parts and percentages referred to herein are by weight.

Example 1

The preparation of 3-methyl-4-hydroxy-5-(dimethylaminomethyl)benzyl N,N-dimethyldithiocarbamate.

To a solution of 54 g. (0.5 mole) of o-cresol and 190 g. (1.05 mole) of 25% dimethylamine in 250 ml. of ethanol was added 84 g. (1.05 mole) 37% aqueous formaldehyde dropwise with cooling to keep the temperature below 30° C. To the solution was then added 38 g. (0.5 mole) of carbon disulfide and the solution was heated under reflux for three hours. The solution was then cooled and poured into water. The product which separated was extracted with ether.

The ether solution was shaken with a solution of 50 ml. of concentrated HCl in 200 ml. of water. The ether layer from this extraction yielded a solid precipitate which was filtered off, washed with hexane and dried, wt.=15 g. This is the by-product 2-methyl-4,6-bis(dimethylthiocarbamylthiomethyl)phenol, M.P.=123–125°.

The aqueous layer from the extraction was neutralized with aqueous sodium bicarbonate. The solid precipitate which formed was extracted with an ether-benzene mixture, dried with anhydrous sodium sulfate and evaporated down to a solid residue of 3-methyl-4-hydroxy-5-(dimethylaminomethyl) - benzyl N,N - dimethyldithiocarbamate weighing 92 g. (62%), M.P. 98–99° C. after recrystallization from methanol.

*Analysis.*—Calc'd for $C_{14}H_{22}N_2OS_2$: C, 56.4%; H, 7.39%; N, 9.39%; S, 21.45%. Found: C, 56.3%; H, 7.48%; N, 9.40%; S, 21.23%.

Example 2

The preparation of 3-t-butyl-4-hydroxy - 5 - (dimethylaminomethyl)benzyl N,N-dimethyldithiocarbamate.

Using the method described in Example 1, o-t-butylphenol was converted to 3-t-butyl-4-hydroxy-5-(dimethylaminomethyl)benzyl N,N - dimethyldithiocarbamate in 58% yield, M.P. 113–115° C.

*Analysis.*—Cal'cd for $C_{17}H_{28}N_2OS_2$: C, 60.0%; H, 8.24%; N, 8.24%; S, 18.80%. Found: C, 60.29%; H, 8.16%; N, 8.50% S, 18.66%.

Example 3

The preparation of 3-isopropyl-4-hydroxy-5-(dimethylaminomethyl)benzyl N,N-dimethyldithiocarbamate.

Using the method described in Example 1, o-isopropylphenol was converted to 3-isopropyl-4-hydroxy-5-(dimethylaminomethyl)benzyl N,N-dimethyldithiocarbamate in 57% yield, M.P. 79–80° C. after recrystallization from ethanol.

*Analysis.*—Calc'd for $C_{16}H_{26}N_2OS_2$: N, 8.59%; S, 19.62%. Found: N, 8.5%; S, 19.62%.

Example 4

The preparation of 3-sec-butyl-4-hydroxy-5-(dimethylaminomethyl)benzyl N,N-dimethyldithiocarbamate.

Using the method described in Example 1, o-sec-butylphenol was converted to 3-sec-butyl-4-hydroxy-5-(dimethylaminomethyl)benzyl N,N - dimethyldithiocarbamate in 50% yield, M.P. 90–91° C. after recrystallization from ethanol.

*Analysis.*—Calc'd for $C_{17}H_{28}N_2OS_2$: N, 8.24%; S, 18.80%. Found: N, 8.20%; S, 19.11%.

Example 5

The preparation of 3-(alpha-methylnonyl)-4-hydroxy-5-(dimethylaminomethyl)benzyl N,N-dimethyldithiocarbamate.

Using the method described in Example 1, o-(alpha-methylnonyl)phenol was converted to 3-(alpha-methylnonyl)-4 - hydroxy - 5 - (dimethylaminomethyl)phenol in 72% yield. This product was a viscous oil.

Example 6

The preparation of 2,5-dimethyl - 3 - (dimethylaminomethyl)-4-hydroxybenzyl N,N-dimethyldithiocarbamate.

To a solution of 122 g. (1 mole) of 2,5-dimethylphenol and 360 g. (2 moles) of 25% dimethylamine in 200 ml. of ethanol was added 162 g. (2 moles) of 37% aqueous formaldehyde dropwise with cooling to keep the temperature below 30° C. Carbon disulfide (77 g., 1 mole) was then added and the reaction mixture was heated under reflux for four hours. It was then poured into water and the precipitate which formed was filtered off and washed with ethanol. The yield of 2,5-dimethyl-3-(dimethylaminomethyl) - 4 - hydroxybenzyl N,N - dimethyldithiocarbamate was 272 g., 91%, M.P. 143–145° C. after recrystallization from ethanol.

Example 7

The preparation of 2,3-dimethyl-4-hydroxy-5-(dimethylaminomethyl)-benzyl N,N-dimethyldithiocarbamate.

Using the method described in Example 1, 2,3-dimethylphenol was converted to 2,3-dimethyl-4-hydroxy-5-(dimethylaminomethyl)benzyl N,N-dimethyldithiocarbamate in 91% yield, M.P. 90–91° C. after recrystallization from methanol.

Example 8

The prepartion of 3-cyclohexyl-4-hydroxy-5-(dimethylaminomethyl)benzyl N,N-dimethyldithiocarbamate.

To a solution of 88 g. (0.5 mole) of o-cyclohexylphenol and 190 g. (1.05 mole) of 25% aq. dimethylamine in 500 ml. of ethanol was added 84 g. (1.05 mole) of 37% aq. formaldehyde with cooling to keep the temperature below 30° C. The solution was stirred at room temperature for one hour and then was heated at reflux for two hours. The solution was cooled, carbon disulfide (53 g., 0.7 mole) was added, and the solution was heated at reflux for two hours.

The reaction mixture was diluted with water and the product was extracted with benzene. The benzene layer was filtered to remove some insoluble material. It was then shaken with dilute hydrochloric acid and the acidic extract was separated and neutralized with aqueous sodium carbonate. The product which separated was extracted with benzene, washed with water, dried over anhyd. sodium sulfate and evaporated down to yield 127 g. (74%) of 3-cyclohexyl-4-hydroxy-5-(dimethylaminomethyl)benzyl N,N-dimethyldithiocarbamate, M.P. 98–100° C. after recrystallization from hexane.

Example 9

The preparation of 3-cyclooctyl-4-hydroxy-5-(dimethylaminomethyl)benzyl N,N-dimethyldithiocarbamate.

To a solution of 62 g. (0.19 mole) of o-cyclooctylphenol and 68.4 g. (0.38 mole) of 25% aq. dimethylamine in 200 ml. of ethanol was added 30.8 g. (0.38 mole) of 37% aqueous formaldehyde with cooling to keep the temperature below 30° C. Carbon disulfide (14.4 g., 0.19 mole) was added and the solution was heated at reflux for five hours.

The reaction mixture was diluted with water and the product was extracted with ether. The ether layer was then shaken with dilute hydrochloric acid and the acidic extract was separated and neutralized with aqueous sodium carbonate. The product which separated was extracted with ether, washed with water, dried over anhyd. sodium sulfate and evaporated down to yield 3-cyclooctyl-4-hydroxy-5-(dimethylaminomethyl)benzyl N,N-dimethyldithiocarbamate as a liquid residue.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A compound having the general formula

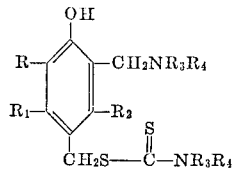

wherein R is selected from the group consisting of alkyl radicals of up to 12 carbon atoms and cycloalkyl radicals of 5 to 8 carbon atoms and aralkyl radicals of 7 to 9 carbon atoms, $R_1$ and $R_2$ are selected from the group consisting of hydrogen and methyl, $R_3$ and $R_4$ are selected from the group consisting of alkyl radicals having up to 5 carbon atoms each.

2. 3 - methyl - 4 - hydroxy - 5 - (dimethylaminomethyl) benzyl N,N-dimethyldithiocarbamate.

3. 3 - t - butyl - 4 - hydroxy - 5 - (dimethylaminomethyl)benzyl N,N-dimethyldithiocarbamate.

4. 3 - cyclooctyl - 4 - hydroxy - 5 - (dimethylaminomethyl)benzyl N,N-dimethyldithiocarbamate.

5. 2,3 - dimethyl - 4 - hydroxy - 5 - (dimethylaminomethyl)benzyl, N,N-dimethyldithiocarbamate.

6. The method of preparing a compound having the general formula

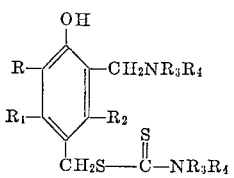

wherein R is selected from the group consisting of alkyl radicals of up to 12 carbon atoms and cycloalkyl radicals of 5 to 8 carbon atoms and aralkyl radicals of 7 to 9 carbon atoms, $R_1$ and $R_2$ are selected from the group consisting of hydrogen and methyl, $R_3$ and $R_4$ are selected from the group consisting of alkyl radicals having up to 5 carbon atoms each, which comprises reacting one molar equivalent of a phenolic compound of the formula

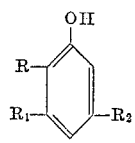

wherein R, $R_1$ and $R_2$ are as above described, with two molar equivalents of formaldehyde, two molar equivalents of a secondary amine of the formula $R_3R_4NH$ in which $R_3$ and $R_4$ are as above described, and one molar equivalent of carbon disulfide.

References Cited

UNITED STATES PATENTS 2,757,174  7/1956  Hardman _____ 260—455 X

CHARLES B. PARKER, *Primary Examiner.*

B. BILLIAN, D. R. PHILLIPS, *Assistant Examiners.*